United States Patent
Ziyaee et al.

(10) Patent No.: US 10,282,623 B1
(45) Date of Patent: May 7, 2019

(54) DEPTH PERCEPTION SENSOR DATA PROCESSING

(71) Applicant: Apple Inc., Cupertino, CA (US)

(72) Inventors: Tarin Ziyaee, San Francisco, CA (US); Byron B. Han, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 36 days.

(21) Appl. No.: 15/275,175

(22) Filed: Sep. 23, 2016

Related U.S. Application Data

(60) Provisional application No. 62/232,863, filed on Sep. 25, 2015.

(51) Int. Cl.
  *G06K 9/00* (2006.01)
  *G06K 9/46* (2006.01)
  *G06K 9/66* (2006.01)

(52) U.S. Cl.
  CPC ....... *G06K 9/00791* (2013.01); *G06K 9/4652* (2013.01); *G06K 9/4661* (2013.01); *G06K 9/66* (2013.01)

(58) Field of Classification Search
  CPC ............. G06K 9/00791; G06K 9/4652; G06K 9/4661; G06K 9/66; G06T 7/90; B60W 30/09
  See application file for complete search history.

(56) References Cited

U.S. PATENT DOCUMENTS

| | | | | |
|---|---|---|---|---|
| 7,486,803 B2 * | 2/2009 | Camus | ................. | B60R 21/013 382/104 |
| 7,660,436 B2 * | 2/2010 | Chang | ................. | G06K 9/3241 382/104 |
| 7,664,315 B2 * | 2/2010 | Woodfill | ............ | G06K 9/00791 345/419 |
| 8,379,994 B2 * | 2/2013 | Dai | ...................... | G06K 9/6262 382/158 |
| 8,447,141 B2 * | 5/2013 | Barenbrug | .............. | G06T 7/507 358/3.26 |
| 9,098,754 B1 * | 8/2015 | Stout | .................. | G06K 9/00805 |

(Continued)

OTHER PUBLICATIONS

Depth Map Generation by Image Classification, Battiato et al., Proceedings vol. 5302, Three-Dimensional Image Capture and Applications VI, Apr. 16, 2004.*

*Primary Examiner* — Brenda C Bernardi
(74) *Attorney, Agent, or Firm* — Robert C. Kowert; Meyertons, Hood, Kivlin, Kowert & Goetzel, P.C.

(57) ABSTRACT

Some embodiments provide a sensor data-processing system which generates a depth data representation of an environment based on sensor data representations which are generated by passive sensor devices. The sensor data-processing system generates the depth data representation via applying an algorithm which includes an model architecture which determines depths of various portions of the represented environment based on detecting features correspond to depth information. The model architecture is established via training an algorithm to generate depth data which corresponds to a sample set of depth data representations of environments, given a corresponding set of image data representations of the environments. As a result, the sensor data-processing system enables depth perception of portions of an environment independently of receiving depth data representations of the environment which are generated by an active sensor device.

20 Claims, 4 Drawing Sheets

(56) References Cited

U.S. PATENT DOCUMENTS

| | | | |
|---|---|---|---|
| 9,292,926 B1* | 3/2016 | Tang | H04N 5/23222 |
| 9,307,222 B1* | 4/2016 | Tang | H04N 5/23222 |
| 9,509,979 B2* | 11/2016 | Livyatan | B60R 1/00 |
| 9,704,054 B1* | 7/2017 | Tappen | G06K 9/46 |
| 9,720,505 B2* | 8/2017 | Gribetz | G02B 27/017 |
| 9,729,858 B2* | 8/2017 | Livyatan | B60R 1/00 |
| 2006/0245617 A1* | 11/2006 | Shan | G06K 9/00791 |
| | | | 382/103 |
| 2007/0260563 A1* | 11/2007 | Fan | G06N 99/005 |
| | | | 706/12 |
| 2009/0268985 A1* | 10/2009 | Wong | G06K 9/209 |
| | | | 382/299 |
| 2011/0102553 A1* | 5/2011 | Corcoran | G06K 9/00281 |
| | | | 348/50 |
| 2013/0141537 A1* | 6/2013 | Li | H04N 5/23212 |
| | | | 348/46 |
| 2013/0215116 A1* | 8/2013 | Siddique | G06Q 30/0643 |
| | | | 345/420 |
| 2013/0258096 A1* | 10/2013 | Ali | G06T 7/0069 |
| | | | 348/135 |
| 2013/0346409 A1* | 12/2013 | Welinder | G06F 17/30598 |
| | | | 707/737 |
| 2014/0125773 A1* | 5/2014 | Maki | G06T 7/408 |
| | | | 348/47 |
| 2015/0015384 A1* | 1/2015 | Shima | B60W 30/095 |
| | | | 340/435 |
| 2015/0248764 A1* | 9/2015 | Keskin | H04N 5/33 |
| | | | 382/106 |
| 2015/0248765 A1* | 9/2015 | Criminisi | G06T 7/50 |
| | | | 382/106 |
| 2015/0319422 A1* | 11/2015 | Fereyre | G01S 17/107 |
| | | | 348/46 |
| 2015/0344032 A1* | 12/2015 | Oh | B60W 30/16 |
| | | | 701/37 |
| 2015/0377607 A1* | 12/2015 | Einecke | G01B 11/026 |
| | | | 382/104 |
| 2016/0171315 A1* | 6/2016 | Yi | G06K 9/00791 |
| | | | 382/154 |
| 2016/0232412 A1* | 8/2016 | Nishijima | G06K 9/00791 |
| 2016/0259994 A1* | 9/2016 | Ravindran | G06K 9/00 |
| 2016/0335503 A1* | 11/2016 | Zhang | G06K 9/00 |
| 2016/0339959 A1* | 11/2016 | Lee | B62D 15/0265 |
| 2016/0350930 A1* | 12/2016 | Lin | G06K 9/66 |
| 2017/0084038 A1* | 3/2017 | Dane | G06K 9/00798 |
| 2017/0104920 A1* | 4/2017 | Kim | G06K 9/00268 |
| 2017/0220876 A1* | 8/2017 | Gao | G06K 9/00805 |
| 2017/0270371 A1* | 9/2017 | Dhana Sekaran | G06K 9/00791 |
| 2017/0309018 A1* | 10/2017 | Shalev | G06T 7/0012 |
| 2017/0330029 A1* | 11/2017 | Turcot | A61B 5/04 |
| 2017/0339397 A1* | 11/2017 | Livyatan | B60R 1/00 |

* cited by examiner

DEPTH PERCEPTION SENSOR DATA PROCESSING

This application claims benefit of priority of U.S. Provisional Application Ser. No. 62/232,863, filed Sep. 25, 2015, which is hereby incorporated by reference herein in its entirety.

BACKGROUND

In many situations, objects in an environment can be detected at a sensor-data processing system which processes sensor data representations of the environment which are generated by one or more sets of sensor devices coupled to the computer system.

In some cases, the sensor data processing system can be included in a vehicle, where the vehicle can be autonomously navigated through an environment based on sensor data representations of the environment which are generated by one or more sets of sensor devices included in the vehicle. Based on the sensor data representations, a control system included in the vehicle can navigate the vehicle along one or more various driving routes which avoid intersection with various dynamic elements, static elements, etc. located in the environment.

In some cases, utilizing sensor data representations of an environment to navigate a vehicle includes processing the sensor data representations to detect, in the representations, objects located in the environment. For example, where a sensor data representation of an environment includes a captured image of at least a portion of the environment, the processing can include detecting an object in the captured image. However, in some cases, accurately detecting objects in an environment based on sensor data representation processing can be insufficiently responsive and excessively expensive for ideal use.

In some cases, one or more sensor devices included in a vehicle can generate a sensor data representation of at least a portion of the environment, independently of interacting with any portion of the environment. Such sensor devices can be referred to as passive sensor devices, and the sensor data representations generated by the passive sensor devices can include passive sensor data representations, which can include one or more images of the one or more portions of the environment. Such images can indicate, for various portions of the environment represented by various sets of pixels of the image, various features of the various portions of the environment, including one or more of color brightness, etc. In some cases, one or more sensor devices included in a vehicle can generate a sensor data representation of the environment based on interacting with a portion of the environment. Such sensor devices can be referred to as active sensor devices, and the sensor data representations generated by the active sensor devices can include active sensor data representations. In some embodiments, an active sensor data representation of an environment includes indications of depth of various portions of the environment from one or more of the active sensor devices. In some embodiments, an active sensor device includes a depth camera device.

DETAILED DESCRIPTION

Figure 1:
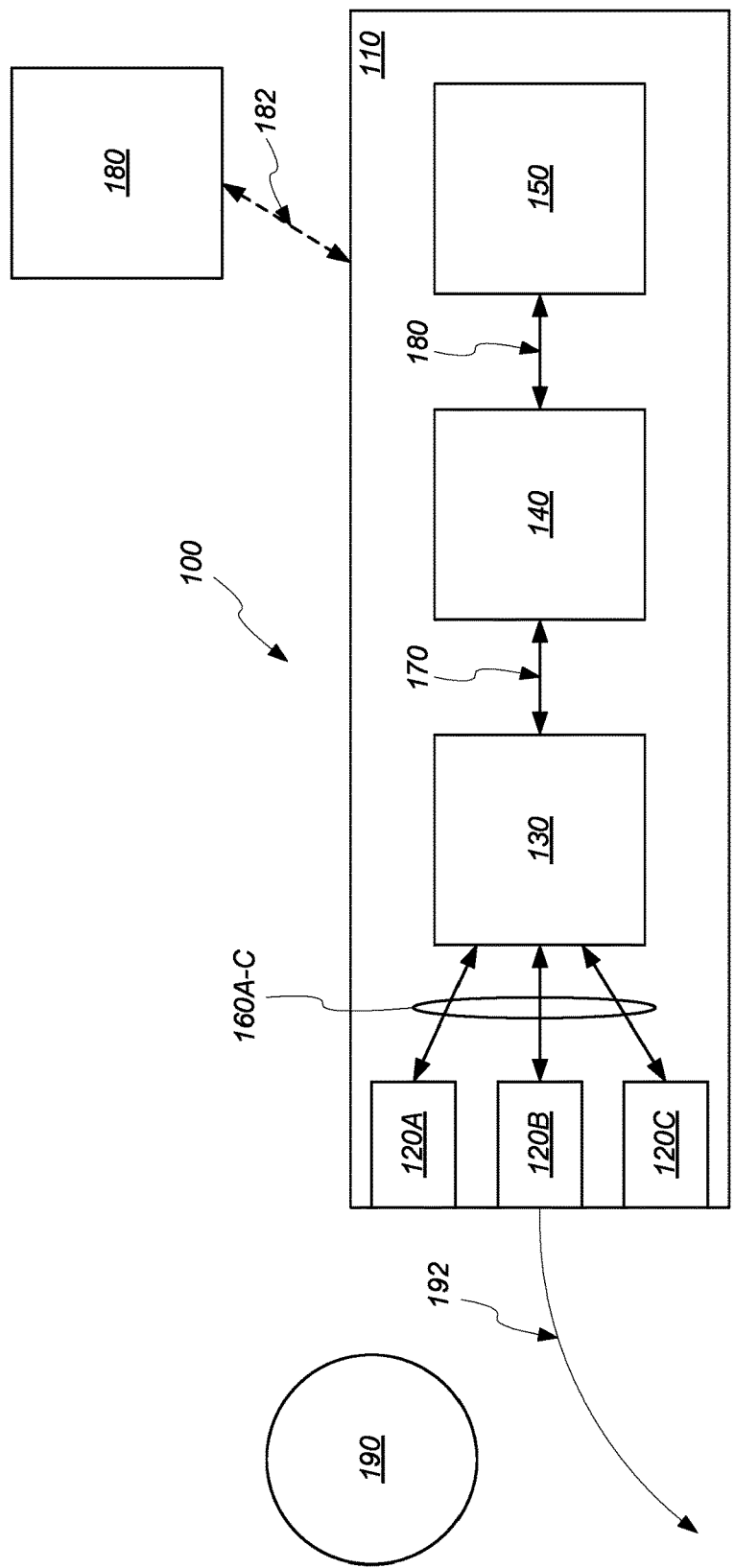
FIG. 1 illustrates a vehicle, according to some embodiments.

Some embodiments include a sensor data-processing system which can generate a depth data representation of an environment based on an input passive sensor data representation of the environment. The sensor data-processing system can generate the depth data representation via application of a sensor data-processing algorithm to the input passive sensor data representations, where the sensor data-processing algorithm, also referred to herein as simply an algorithm, includes a deep learning model architecture which generates the depth data via identifying, in the passive sensor data representation, features which are determined to correspond to depth data associated with various portions of the environment.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

FIG. 1 illustrates a vehicle, according to some embodiments. The vehicle 110 is located in an external environment 100 and can include an autonomous navigation system 140 which can autonomously control one or more vehicle control elements 150 to cause the vehicle to be navigated along one or more driving routes 192 through the environment 100 based on various objects 190 detected and classified in the environment 100.

Vehicle 110 includes a set of one or more sensor devices 120A-C in the vehicle which are configured to monitor one or more portions of the environment 100. It will be understood that, although three sensor devices 120A-C are illustrated in FIG. 1, the vehicle 110 can, in some embodiments, include any number of sensor devices. Each sensor device 120A-C can include one or more of a camera device, infrared camera device, near-infrared camera device, ultrasonic sensor device, depth camera device, kinematic sensor device, geo-positioning sensor device, some combination thereof, etc. As referred to herein, a depth camera can include any camera device which can generate a sensor data representation of an environment which includes information indicating relative depth of one or more portions of the environment relative to one or more portions of the camera, vehicle, etc. and can include one or more of a light beam scanning device, LIDAR device, stereo sensor device, etc. Each sensor device generates, as raw data, sensor data representations of one or more portions of the environment 100 which the respective device is monitoring.

Sensor devices 120A-C can be communicatively coupled, via one or more communication links 160A-C, to a sensor data-processing system 130 which can be implemented by one or more computer systems and implements one or more sensor data classifier models via which the sensor data representations are processed to detect and classify features in the representations as being representations of one or more particular objects 190 in the environment 100. System 130, in some embodiments, implements one or more Deep Neural Network (DNN) algorithms, also referred to herein as one or more model architectures, to at least partially process sensor data representations generated by one or more sensors 120.

Vehicle 110 includes an autonomous navigation system 140 which is communicatively coupled to system 130 via a communication link 170. The system 140 can be implemented by one or more computer systems and is configured to develop a driving route 192 through the environment 100 based on the detection and classification of features in the environment 100. The system 140 further generates control command signals which are transmitted, via one or more communication links 180, to one or more vehicle control elements 150 and which, when executed by the one or more vehicle control elements 150, cause the vehicle 110 to be navigated along the driving route 192. As shown, the driving route 192 can navigate the vehicle 110 in avoidance of the object 190 in the environment 100. The system 140 can be configured to generate a driving route 192 which navigates the vehicle 110 to avoid objects 190 in the environment 100, based on a detection of the object 190 at system 130. A vehicle control element can include one or more of a throttle control device, a steering control device, a braking control device, etc.

In some embodiments, vehicle 110 includes a set of one or more sensor devices 120A-C which include passive sensor devices, including one or more of visible light camera device, infrared camera devices, near-infrared camera devices, stereo camera devices, etc. which generate sensor data representations of one or more portions of environment 100 independently of interacting with the environment. For example, sensors 120A-C can be independent of any light beam scanning devices which generate, as a sensor data representations of the environment, a point cloud of various objects 190 in the environment 190 based on reflection of emitted light beams off of various points on the objects 190. A sensor data representation of an environment which includes information indicating depths of various portions of the environment relative to a reference point, including a location of one or more sensors, can be referred to herein as a depth data representation of the environment, and a passive sensor data representation of the environment, generated by one or more passive sensor devices, can be referred to herein as an image data representation of the environment.

In some embodiments, the sensor data-processing system 130 generates output data which is used to identify one or more objects in the environment 190, and develop driving routes 192 which account for the identified objects 190, where the output data includes depth data representations of the environment 100, which indicates a depth of one or more portions of a monitored portion of the environment 100 relative to a reference point, based on image data representations of that portion of the environment which are generated by one or more of sensors 120A-C.

In some embodiments, system 130 utilizes an algorithm which includes a particular model architecture to generate the depth data based on input data, to the system 130 from sensors 120A-C, which comprises passive sensor data representations generated by one or more passive sensors, where the passive sensor data includes information which is separate from depth data regarding one or more portions of the environment, including color, brightness, etc. The model architecture, in some embodiments, determines depth of an object 190 in the environment 100 based on passive sensor data, including image data representations of the environment which indicate information regarding the object 190 which is separate from depth, including one or more of color, brightness, etc. As a result, vehicle 110 can determine positions of objects 190 in the environment 100, and develop driving routes 192 via which the vehicle 110 can be navigated accordingly, independently of the vehicle 110 including one or more active sensor devices, thereby reducing capital costs associated with the vehicle 110 and augmenting safe navigation of a vehicle 110 which comprises passive sensor devices 120. In addition, a sensor data-processing system which utilizes the model architecture to generate output depth data based on input image data of an environment can provide augmented processing of sensor data for stereo image data received from multiple sensors 120A-C, as the model architecture can determine object 190 depth independently of stereo correspondence, which can thereby at least partially mitigate motion blur associated with stereo sensor monitoring of the environment 100.

In some embodiments, one or more portions of the vehicle 110, including one or more sensor data-processing systems 130 included therein, are communicatively coupled 182, via one or more communication networks, to one or more remotely-located computer systems 180. In some embodiments, one or more algorithms, model architectures, etc. utilized by one or more of the sensor data-processing systems 130 to generate output data based on input data received from one or more of the sensors 120A-C is received from one or more remotely-located computer systems 180 via one or more communication networks. In some embodiments, one or more instances of input data received from one or more of the sensors 120A-C, one or more instances of output data generated by the sensor data-processing system 130 based on the one or more instances of input data, some combination thereof, etc. are communicated from vehicle 110 to one or more remotely-located computer systems 180 via one or more communication networks.

Figure 2:
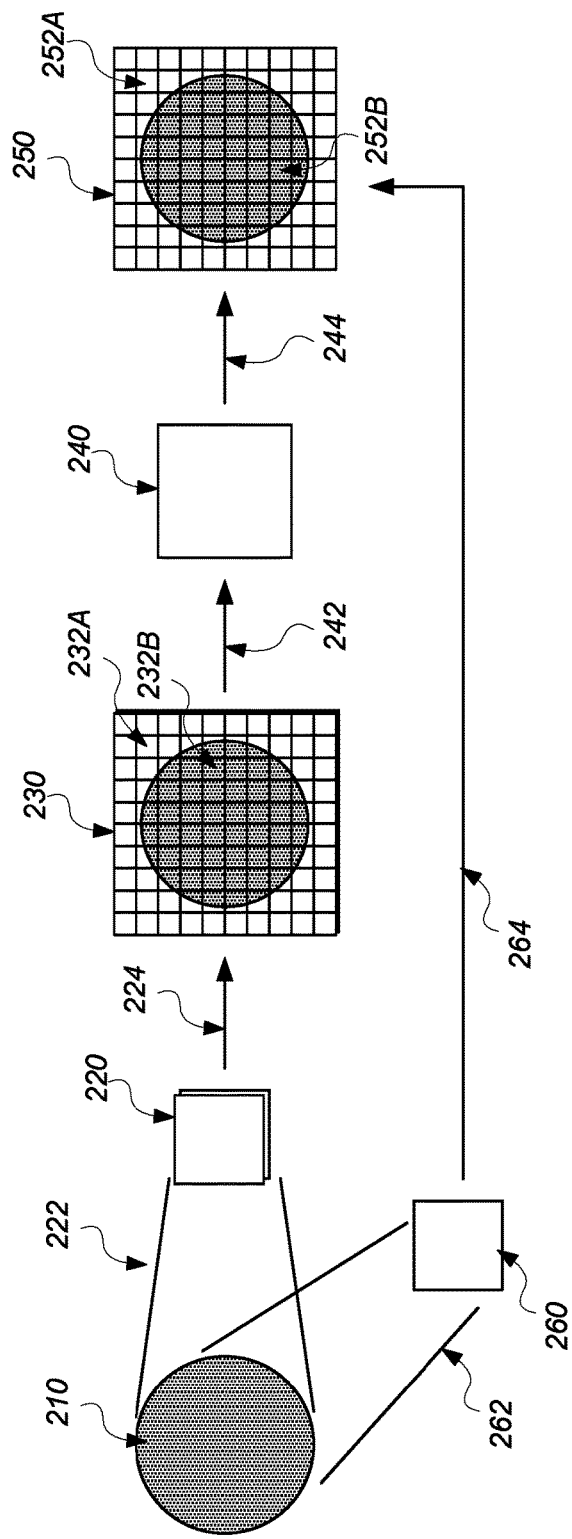
FIG. 2 illustrates a vehicle which includes a sensor data-processing system generating output depth data regarding a portion of an environment in which an object is located, based on input image data generated by one or more passive sensor devices, according to some embodiments.

FIG. 2 illustrates a vehicle which includes a sensor data-processing system generating output depth data regarding a portion of an environment in which an object is located, based on input image data generated by one or more passive sensor devices, according to some embodiments. The sensor data-processing system can include any embodiment of sensor data-processing system included herein.

In some embodiments, a vehicle includes a set of passive sensor devices 220 which monitor 222 a portion of an external environment which includes an object 210. Monitoring a portion of an external environment can include generating a passive sensor data representation of the portion of the environment, which can include capturing an image of the portion of the external environment, also referred to herein as an image data representation of the portion of the external environment. As a result, the passive sensor devices 220 can generate, as part of output data 224 of the sensor devices 224, one or more images 230 of the portion of the environment. As shown in FIG. 2, where the images 230 are generated as a result of sensors 220 monitoring 222 a portion of an environment which includes an object 210, the images 230 include images of the object 210.

As shown, the image 230 comprises a set of portions 232 of the image. In some embodiments, each separate portion comprises a set of one or more pixels comprising the image 230. Each portion 232 is associated with one or more instances of information regarding the monitored environment. For example, where the image 230 is generated as an output of a visible light camera 220 monitoring the environment, the various portions 232 of the image can each be associated with one or more of a color value, brightness value, contrast value, etc. For example, as shown in FIG. 2, where the object 210 is darker than surrounding portions of the environment, the image 230 includes portions 232A which are associated with relatively high brightness values and portions 232B which are associated with relatively low brightness values. As a result, the information included in the image 230 can include information regarding color, brightness, etc. regarding the object 210 and various other portions of the monitored environment.

As shown, the images 230 can be provided as input data 242 to the sensor data-processing system 240. The sensor data-processing system can, based on processing the images 230 via one or more algorithms which include one or more model architectures, generate, as output data 244, one or more depth data representations 250 of the monitored 222 environment which include portions 252 which are each associated with separate instances of depth information, where the depth information indicates a depth of the portion of the environment represented by the respective portion 252 from one or more of the sensor devices 220, a vehicle in which the sensor devices are located, etc. For example, where object 210 is located in a foreground of the external environment, portions 252B which include representations of one or more portions of the object 210 can be associated with depth data indicating a certain depth of each respective portion of the object 210 represented by the respective portions 252B, and portions 252A which include representations of one or more portions of the background of the external environment can be associated with depth data indicating a certain depth of each respective portion of the background represented by the respective portions 252A.

In some embodiments, depth data representations 250, also referred to as depth images, of the environment can be generated by one or more active sensor devices which interact with one or more portions of the environment and generate sensor data representations of the environment which indicate relative depths of various portions of the represented environment. As shown, for example, where an active sensor device 260 monitors 262 a portion of the environment in which the object 210 is included, the depth image 250 can be generated as an output 264 of the active sensor device 260. In some embodiments, a depth image comprises a point cloud of a portion of an environment, where separate portions 252 of the image comprise separate reflection points comprised in the point cloud.

In some embodiments, a sensor data-processing system 240 which is configured to generate a depth data representation 250 of various portions of the environment which corresponds to active sensor 260 output 264, based on sensor data input 242 which comprises passive images 230 of the environment which are generated by passive sensor devices 220, enables a vehicle which comprises sensors 220 and system 240 to detect and identify objects, including depths of said objects, in the environment, also referred to herein as "depth perception" of environment objects, independently of the vehicle including an active sensor device 260, thereby reducing the capital expenditures required to install active sensors in a vehicle to enable depth perception.

Figure 3:
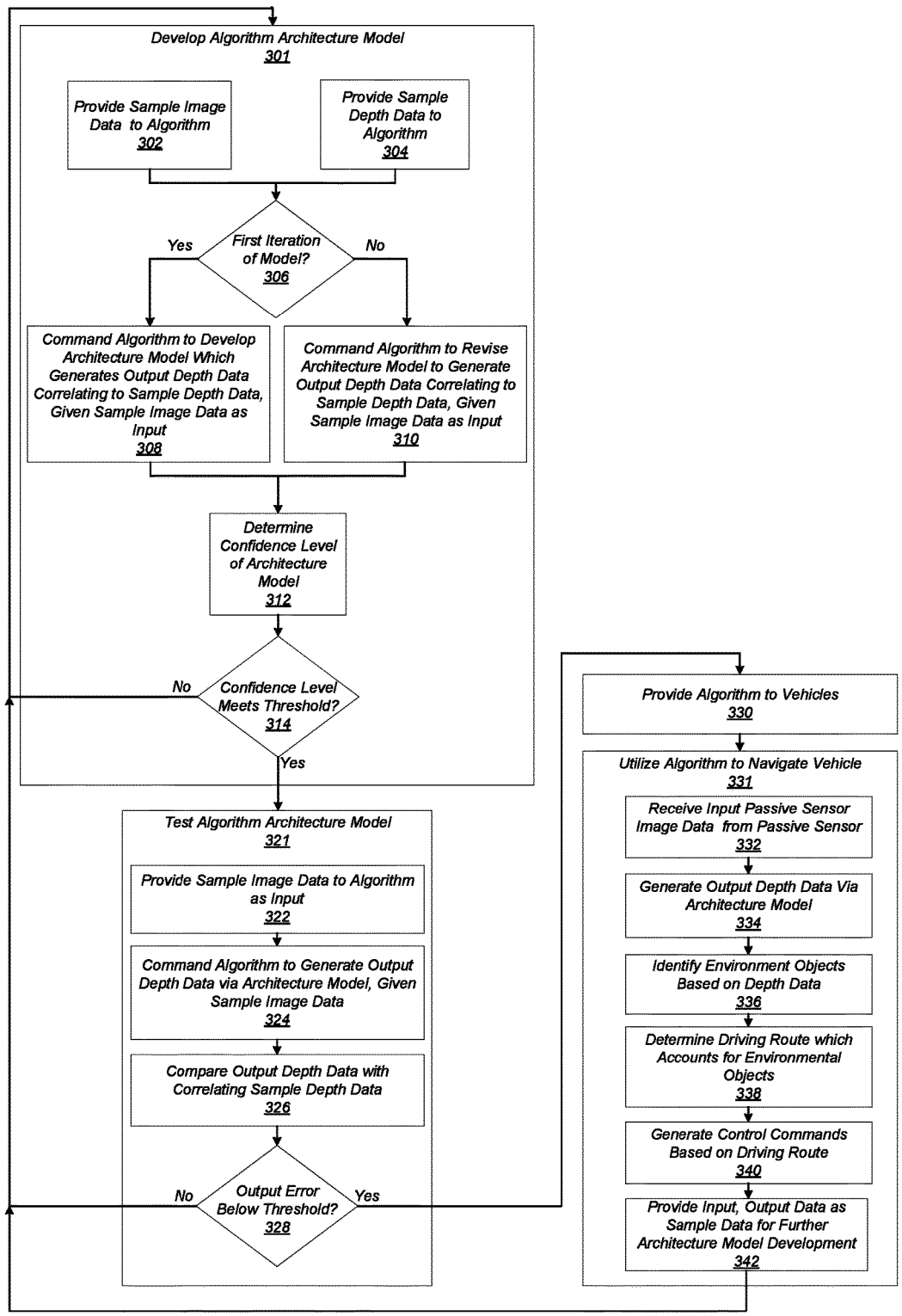
FIG. 3 illustrates configuring a sensor-processing algorithm, which can include a model architecture which is installed in a sensor data-processing system of a vehicle, to generate output depth data representations of an environment based on input passive sensor data representations of the environment, according to some embodiments.

FIG. 3 illustrates configuring a sensor-processing algorithm, which can include a model architecture, which is installed in a sensor data-processing system of a vehicle, to generate output depth data representations of an environment based on input passive sensor data representations of the environment, according to some embodiments. The sensor data-processing system can include any embodiment of sensor data-processing system included herein.

In some embodiments, configuring an algorithm to include a model architecture which, when included in a sensor data-processing system, can generate an accurate depth data representation of an environment, based on processing passive sensor data representations, also referred to herein as image data representations, of the environment generated by one or more passive sensor devices, includes the algorithm being "trained" to determine depth data for a given portion of the environment based on various identified features, in the passive sensor data representations, which are associated with the various depths.

In some embodiments, training an algorithm via traditional machine learning includes configuring the system to detect and classify features based on predetermined features which can be included in sensor data representations. Such features can be manually (i.e., by a human being) determined based on manual analysis of sensor data representations, manual identification of features in the representations, manual classification of the features as being associated with one or more particular class labels, etc. The algorithm which implements traditional machine learning can classify sensor data representation features via comparison of sensor data representations with the manually-determined sensor data features and can detect and classify features in a sensor data representation based on comparison with the manually-determined features.

Because the features are manually determined, rather than being autonomously developed based on sensor data, the features which can be classified in the sensor data representations can be restricted to the particular features developed based on manual input.

Some embodiments include an algorithm which processes sensor data representations generated by various sensor devices via one or more deep-learning systems which classify features included in the representations via utilization of deep learning model architectures.

Deep learning comprises a branch of machine learning based on a set of algorithms that attempt to model high-level abstractions in data by using model architectures, with complex structures or otherwise, composed of multiple non-linear transformations.

Deep learning is part of a family of machine learning methods based on learning features of environment objects in an environment based on processing sensor data representations of a portion of the environment. An observation of a portion of an environment (e.g., an image of the environment portion) can be represented in many ways, including as a vector of intensity values per pixel, in a more abstract way as a set of edges, regions of particular shape, etc. Some representations by one or more sensors are also referred to herein as sensor data representations and facilitate learning, by one or more machines implementing one or more machine learning methods, of one or more tasks (e.g., face recognition or facial expression recognition) from examples. In some embodiments, implementing deep learning enables autonomous learning of particular features in sensor data representations via which various elements in the environment (also referred to as environment objects) can be detected and classified. Learning a feature can include the system autonomously identifying and classifying one or more features, in one or more sensor data representations of an environment, which correspond to one or more particular environmental elements in the environment, including a particular depth of the one or more particular elements in the environment. Autonomous learning of features can negate utilization of manually-developed features, as the features can be autonomously extracted, learned, etc. based on processing sensor data representations via deep learning.

Deep learning autonomously determines features to detect and classify as corresponding to particular environment depth data from raw image sensor data input, also referred to as passive sensor data representations, and these features can be hierarchal, including multiple layers of features. Each layer of features can be based on previous layers of less-complex features so that higher-tier features are more complicated than lower-tier features upon which the higher-tier features are based.

As a result, deep learning methods where features are learned autonomously, rather than receiving manually-determined features, results in a sensor-processing method which provides better overall feature classification performance than traditional machine learning methods where features are generally manually pre-determined. Deep learning based methods can require more data than traditional machine learning methods but also can utilize more data input, can handle multiple classes of environment objects, etc.

A sensor data-processing system which includes one or more sensor feature classifier layers which utilize deep learning algorithms, which can include one or more model architectures developed via deep learning, can be referred to herein as utilizing one or more deep neural networks (DNN).

Training of such algorithms, which includes developing the model architectures included in an algorithm, can be implemented as an iterative process. Such a process can include building a deep learning model architecture, training a deep learning algorithm, also referred to herein as a model architecture, to autonomously determine depth data based on input passive sensor data, and testing the model architecture applying the determined features to generate accurate depth sensor data representations of an environment based on passive sensor data representations of the environment. The process can be iterative, where various elements of the model architecture can be adjusted with successive iterations, until one or more of accuracy and precision of the detection and classification of features is achieved.

Once an algorithm, model architecture, etc. is trained, it is installed into a sensor data-processing system located in a vehicle. A sensor data-processing system which implements a deep learning algorithm can require less time and power to process sensor data, relative to traditional sensor data-processing systems, including sensor data-processing systems utilized to develop depth data representations of an environment based on stereo images of the environment. In some embodiments, a sensor data-processing system implementing a deep learning algorithm implements general computing hardware configurations, including one or more of general CPU and GPU configurations. In some embodiments, a sensor data-processing system implementing a deep learning algorithm implements one or more particular computing hardware configurations, including one or more of Field-programmable gate array (FPGA) processing circuitry, neuromorphic processing circuitry, etc. Particular computing hardware configurations can provide augmented computing performance with reduced power consumption, relative to conventional hardware configurations, which can be beneficial when a sensor data-processing system implements one or more deep learning algorithms, which can be relatively computationally expensive relative to traditional data-processing algorithms.

DNN algorithms can be utilized by a sensor data-processing system included in a vehicle which is configured to be autonomously navigated, where the DNN algorithms are utilized for "perception". Perception refers to the sensor data-processing system processing sensor data representations of an environment which are generated by sensor devices in the vehicle to generate output information which characterizes the various elements located in the environment. For example, a perception output from a sensor data-processing system located in a vehicle navigating along a road can include information indicating that there are 3 cars and 2 people on the road, the distances, velocity and trajectories of the objects, etc. The output information can be utilized by one or more autonomous navigation systems in the vehicle to determine how to navigate the vehicle based on the information, including determining a speed, trajectory, etc. of the vehicle.

At 301, the model architecture is developed via sample input and output data, which includes iteratively developing the model architecture to generate output depth data representations, based on sample input image data representations, which correspond to sample depth data representations. The samples of data can be generated based on recording various external environments via passive and active sensors.

As shown, the development 301 includes providing the sample input image data representations 302 and sample depth data representations to a deep learning algorithm. If, at 306 and 308, the model architecture is in its first iteration, such that a previously-developed model architecture is absent, an initial model architecture is developed by the algorithm, where the algorithm configures the initial model architecture generates a set of output depth data representations, based on the sample input data, which corresponds to the sample output data. If, at 306 and 310, a previously-developed model architecture exists, the existing architecture is revised by the algorithm, using deep learning, to generate a set of output depth data representations, based on the sample input data, which corresponds to the sample output data. The quantity of revisions to the model at 310 to arrive at a model architecture which can be used by the algorithm to generate said output data can be used to determine a confidence level 312 associated with the model architecture. Where a model architecture receives fewer revisions relative to a previous iteration of the model architecture at 310, the confidence level can be increased, and where the model architecture receives more revisions at 310 relative to a previous iteration of the model architecture, the confidence level can be decreased.

The commanding at 306 and 308 comprises, in some embodiments, the training of the algorithm via deep learning to develop a model architecture which comprises a hierarchical set of features via which depth data for a portion of the environment represented in a passive sensor data representation can be determined. The commanding 306, 308 includes commanding the development, revision, etc. of a hierarchical model architecture via which the sample depth data can be generated as output of the model architecture, based on the sample image data being provided as input to the algorithm.

The commanding at 306, 308 can include commanding the development, revision, etc. of a model architecture to generate output depth data, based on the sample image data, which correlates with the sample depth data within a certain margin of error.

At 314, if the determined confidence level does not meet a threshold confidence level, the model architecture is determined to be not yet sufficiently accurate, precise, etc. and is iteratively developed further, via 302-312, until the confidence level meets the threshold. Separate iterations at 301 can utilize separate sets of sample input and output data. In some embodiments, the confidence level associated with a model architecture is associated with a quantity of samples for which the model architecture developed at 301 generates corresponding output data with no revisions between iterations.

At 314, where the confidence level associated with the model architecture is determined to meet a threshold confidence level, the model architecture is tested at 321. Testing the model architecture can also be referred to as validating the model architecture. While the development at 301 includes developing the model architecture to generate output data which correlates to sample depth data, the testing at 321 includes comparing output depth data generated by the model architecture, given a sample set of image data input, with a sample set of depth data which corresponds to the sample set of image data input and determining whether the error of the generated output from the "ground truth" sample depth data is below a threshold error level.

At 322 a sample image data representation of an environment is provided to the algorithm which comprises the model architecture. At 324, the algorithm, via the model architecture, generates output depth data based on the same input image data, where the output depth data comprises a depth data representation of the environment. At 326, the generated output depth data is compared with a sample set of depth data representations of the sample environment. At 328, a determination is made regarding the error between the sample depth data and the output depth data generated by the algorithm. If the error is at least as great as a predetermined error threshold level, the algorithm comprising the model architecture is returned to development at 301 for further revision and refinement. Returning the algorithm to development at 301 can include reducing the confidence level, and the development 301 can be repeated until the confidence level is determined to at least meet the threshold confidence level. If the model architecture is determined, at 328, to have a sufficiently low error level, the model architecture comprised in the algorithm is determined to be validated and the algorithm is provided, at 330, to one or more sensor data-processing systems of one or more vehicles, where the algorithm can be used, via the model architecture, to generate depth data representations of environments monitored by passive sensor devices installed in the vehicle, at 331. Providing an algorithm to a sensor data-processing system at 330 can include installing the algorithm in the sensor data-processing system. In some embodiments, the algorithm is developed, tested, etc. at one or more computer systems which are remotely located from one or more vehicles in which the one or more sensor data-processing systems are included, and providing an algorithm to a sensor data-processing system at 330 can include communicating the algorithm to the sensor data processing system via one or more communication networks.

As shown, the utilization of the algorithm in a sensor data-processing system in a vehicle at 331 includes, at 332, receiving passive sensor image data as input from one or more passive sensor devices installed in the vehicle. At 334, the algorithm, via the model architecture, generates output depth data representations of the environment based on the input passive sensor data representations of the environment. At 336, one or more objects located in the environment are detected and identified based on the depth data representations of the environment. At 338, a driving route which accounts for the identified objects in the environment, which can include a driving route which avoids intersection with one or more of the identified objects, is determined. At 340, a set of control element command signals which, when executed by a set of vehicle control elements, cause the vehicle to be navigated according to the driving route, are developed. At 342, the input passive sensor data received at 332 and the output depth data generated at 334 can be provided as sample data which can be utilized for further development of an algorithm at 301. The providing at 342 can include communicating data from a vehicle in which the sensor data-processing system is included to one or more remotely-located computer systems, which can include one or more of the computer systems at which the developing 301 and testing 321 are implemented, via one or more communication networks.

Figure 4:
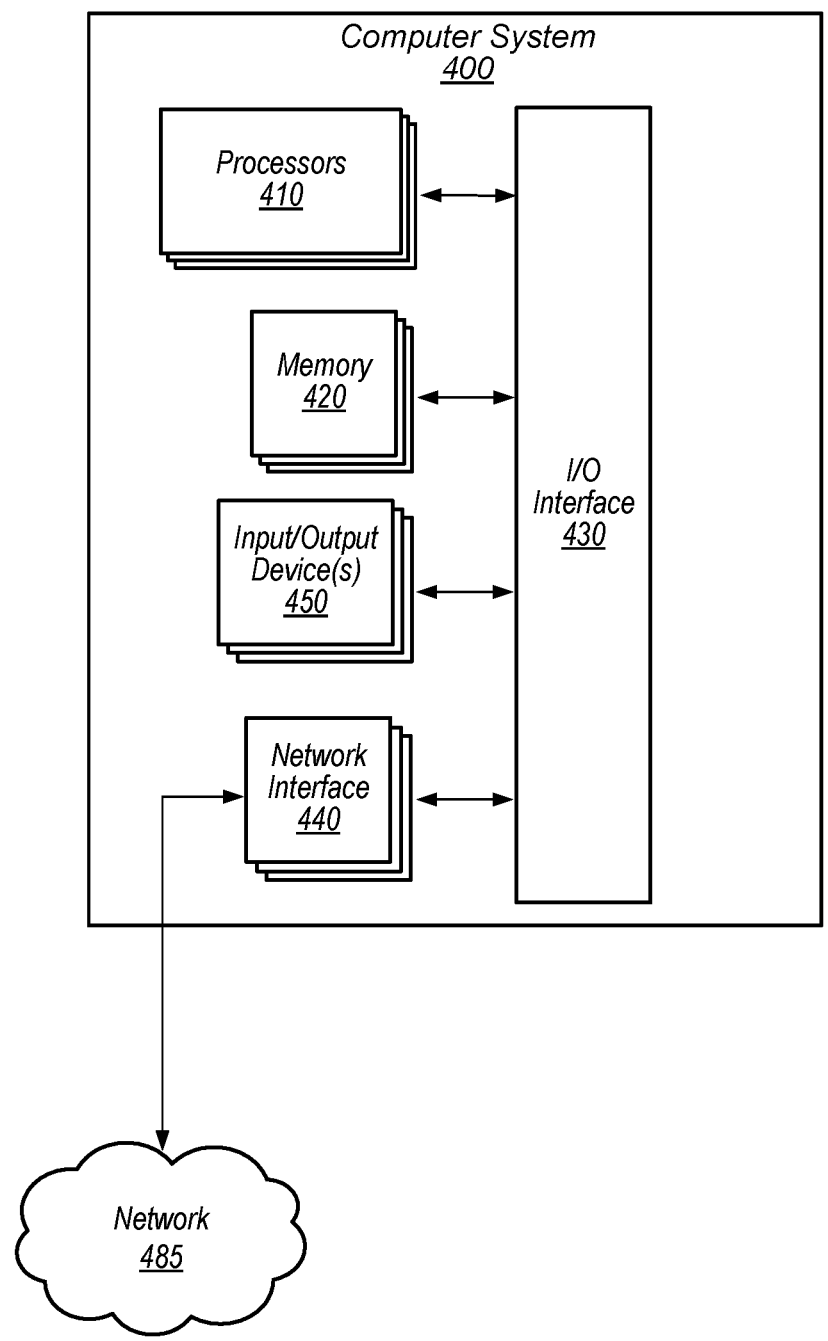
FIG. 4 illustrates an example computer system that may be configured to include or execute any or all of the embodiments described above.

FIG. 4 illustrates an example computer system 400 that may be configured to include or execute any or all of the embodiments described above. In different embodiments, computer system 400 may be any of various types of devices, including, but not limited to, a personal computer system, desktop computer, laptop, notebook, tablet, slate, pad, or netbook computer, cell phone, smartphone, PDA, portable media device, mainframe computer system, handheld computer, workstation, network computer, a camera or video camera, a set top box, a mobile device, a consumer device, video game console, handheld video game device, application server, storage device, a television, a video recording device, a peripheral device such as a switch, modem, router, or in general any type of computing or electronic device.

Various embodiments of a sensor data-processing system as described herein, may be executed in one or more computer systems 400, which may interact with various other devices. Note that any component, action, or functionality described above with respect to FIGS. 1 through 3 may be implemented on one or more computers configured as computer system 400 of FIG. 4, according to various embodiments. In the illustrated embodiment, computer system 400 includes one or more processors 410 coupled to a system memory 420 via an input/output (I/O) interface 430. Computer system 400 further includes a network interface 440 coupled to I/O interface 430, and one or more input/output devices, which can include one or more user interface (also referred to as "input interface") devices. In some cases, it is contemplated that embodiments may be implemented using a single instance of computer system 400, while in other embodiments multiple such systems, or multiple nodes making up computer system 400, may be configured to host different portions or instances of embodiments. For example, in one embodiment some elements may be implemented via one or more nodes of computer system 400 that are distinct from those nodes implementing other elements.

In various embodiments, computer system 400 may be a uniprocessor system including one processor 410, or a multiprocessor system including several processors 410 (e.g., two, four, eight, or another suitable number). Processors 410 may be any suitable processor capable of executing instructions. For example, in various embodiments processors 410 may be general-purpose or embedded processors implementing any of a variety of instruction set architectures (ISAs), such as the x86, PowerPC, SPARC, or MIPS ISAs, or any other suitable ISA. In multiprocessor systems, each of processors 410 may commonly, but not necessarily, implement the same ISA.

System memory 420 may be configured to store program instructions, data, etc. accessible by processor 410. In various embodiments, system memory 420 may be implemented using any suitable memory technology, such as static random access memory (SRAM), synchronous dynamic RAM (SDRAM), nonvolatile/Flash-type memory, or any other type of memory. In the illustrated embodiment, program instructions included in memory 420 may be configured to implement some or all of an ANS, incorporating any of the functionality described above. Additionally, existing automotive component control data of memory 420 may include any of the information or data structures described above. In some embodiments, program instructions and/or data may be received, sent or stored upon different types of computer-accessible media or on similar media separate from system memory 420 or computer system 400. While computer system 400 is described as implementing the functionality of functional blocks of previous Figures, any of the functionality described herein may be implemented via such a computer system.

In one embodiment, I/O interface 430 may be configured to coordinate I/O traffic between processor 410, system memory 420, and any peripheral devices in the device, including network interface 440 or other peripheral interfaces, such as input/output devices 450. In some embodiments, I/O interface 430 may perform any necessary protocol, timing or other data transformations to convert data signals from one component (e.g., system memory 420) into a format suitable for use by another component (e.g., processor 410). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. Also, in some embodiments some or all of the functionality of I/O interface 430, such as an interface to system memory 420, may be incorporated directly into processor 410.

Network interface 440 may be configured to allow data to be exchanged between computer system 400 and other devices attached to a network 485 (e.g., carrier or agent devices) or between nodes of computer system 400. Network 485 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 440 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices may, in some embodiments, include one or more display terminals, keyboards, keypads, touchpads, scanning devices, voice or optical recognition devices, or any other devices suitable for entering or accessing data by one or more computer systems 400. Multiple input/output devices may be present in computer system 400 or may be distributed on various nodes of computer system 400. In some embodiments, similar input/output devices may be separate from computer system 400 and may interact with one or more nodes of computer system 400 through a wired or wireless connection, such as over network interface 440.

Memory 420 may include program instructions, which may be processor-executable to implement any element or action described above. In one embodiment, the program instructions may implement the methods described above. In other embodiments, different elements and data may be included. Note that data may include any data or information described above.

Those skilled in the art will appreciate that computer system 400 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 400 may be transmitted to computer system 400 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. An apparatus, comprising:
a sensor data-processing system configured to:
generate a depth data representation of an environment, wherein the depth data representation indicates a depth of one or more portions of the environment relative to a location of a reference point, based on processing an image data representation of the environment in accordance with a sensor data-processing algorithm, wherein the image data representation of the environment is generated by one or more passive sensor devices;
compare the depth data representation and a sensor data representation of the environment, wherein the sensor data representation of the environment is generated by one or more active sensor devices;
iteratively adjust the algorithm based on a comparison of the depth data representation and the sensor data representation until a confidence level for the algorithm satisfies a threshold confidence level, wherein the confidence level is determined based on a magnitude of revisions to the algorithm per iteration of adjustment, and wherein each iteration comprises generation of another depth data representation based on processing another image data representation and comparison of the other depth data representation and another sensor data representation.

2. The apparatus of claim 1, wherein the algorithm comprises at least one of:
at least one traditional machine learning algorithm; or
at least one deep learning algorithm.

3. The apparatus of claim 1, wherein:
the image data representation of the environment comprises an image of the environment, wherein the image comprises a set of pixels which are each associated with one or more of a color value and a brightness value; and
the depth data representation of the environment comprises an image of the environment, wherein the image comprises a set of pixels which are each associated with at least a depth of the portion of the environment represented by the pixel from a reference point.

4. A method, comprising:
performing, by one or more computer systems:
establishing a sensor data-processing algorithm comprising a deep learning model architecture configured to generate a depth data representation of an environment, which indicates a depth of one or more portions of the environment relative to a location of a reference point, based on processing an image data representation of the environment which is generated by one or more passive sensor devices, wherein the generating the data depth representation comprises:
adjusting the model architecture to cause the algorithm to generate, based on a sample image data representation of an environment, an output depth data representation of the environment, wherein the adjusting the model architecture is performed iteratively until the output depth data representation correlates to a sample depth data representation of the environment within a certain margin of error, wherein the sample depth data representation is generated by one or more active sensor devices, and wherein each iteration comprises generation of another output depth data representation based on processing another sample image data representation and comparison of the other output depth data representation and another sample depth data representation.

5. The method of claim 4, wherein the establishing comprises:
iteratively determining a confidence level for the model architecture based on a magnitude of revisions to the model architecture between iterations, until the confidence level at least meets a threshold confidence level;

wherein the confidence levels, in each given iteration, are inversely proportional to the magnitude of revisions to the model architecture relative to an immediately preceding iteration of the model architecture.

6. The method of claim 5, comprising:
in response to a determination that the confidence level determined for the model architecture at least meets the threshold confidence level, testing the model architecture, wherein the testing comprises:
commanding the algorithm to generate, via the model architecture, an output depth data representation of an environment, based on a sample image data representation of the environment; and
validating the model architecture in response to a determination that a level of error between the output depth data representation and a sample depth data representation of the environment is less than a threshold error level.

7. The method of claim 6, wherein the testing further comprises:
prior to validating the model architecture, and in response to a determination that a level of error between the output depth data representation and a sample depth data representation of the environment at least meets a threshold error level:
reducing the confidence value for the model architecture, and
iteratively performing the adjusting of the model architecture until the confidence level at least meets the threshold confidence level.

8. The method of claim 6, comprising:
in response to validating the model architecture, installing the algorithm in one or more sensor data-processing systems installed in one or more vehicles, wherein the one or more sensor data-processing systems are coupled to one or more passive sensor devices installed in the one or more vehicles, such that the installing configures each vehicle of the one or more vehicles to:
generate depth data representations of environments in which the respective vehicle is located, based on processing image data representations of the environments which are generated by the one or more passive sensor devices installed in the respective vehicle.

9. The method of claim 8, wherein the installing further configures each vehicle of the one or more vehicles to:
identify one or more objects located in the environments in which the respective vehicle is located, based on the generated depth data representations of the environments; and
generate a set of control element command signals which, when executed by a set of control elements installed in the respective vehicle, cause the respective vehicle to be navigated along a driving route which accounts for the identified objects in the environments.

10. The method of claim 9, wherein the installing further configures each vehicle of the one or more vehicles to:
generate a set of control element command signals which, when executed by a set of control elements installed in the respective vehicle, cause the respective vehicle to be navigated along a driving route which avoids intersection with the identified objects in the environments.

11. The method of claim 8, wherein:
each vehicle, of the one or more vehicles, is independent of any active sensor devices configured to generate depth data representations of environments in which the respective vehicle is located, such that the installing configures each vehicle of the one or more vehicles to generate depth data representations of the environments independently of any active sensor devices.

12. The method of claim 4, wherein:
each image data representation of an environment comprises an image of the environment, wherein the image comprises a set of pixels which are each associated with one or more of a color value and a brightness value; and
each depth data representation of an environment comprises an image of the environment, wherein the image comprises a set of pixels which are each associated with at least a depth of the portion of the environment represented by the pixel from a reference point.

13. A non-transitory, computer-readable medium storing a program of instructions which, when executed by at least one computer system, causes the at least one computer system to:
establish a sensor data-processing algorithm comprising a deep learning model architecture configured to generate a depth data representation of an environment, which indicates a depth of one or more portions of the environment relative to a location of a reference point, based on processing an image data representation of the environment which is generated by one or more passive sensor devices, wherein the generating comprises:
adjust the model architecture to cause the algorithm to generate, based on a sample image data representation of an environment, an output depth data representation of the environment, wherein the adjusting the model architecture is performed iteratively until the output depth data representation correlates to a sample depth data representation of the environment within a certain margin of error, wherein the sample depth data representation is generated by one or more active sensor devices, and wherein each iteration comprises generation of another output depth data representation based on processing another sample image data representation and comparison of the other output depth data representation and another sample depth data representation.

14. The non-transitory computer-readable medium of claim 13, wherein the establishing comprises:
iteratively determining a confidence level for the model architecture based on a magnitude of revisions to the model architecture between iterations, until the confidence level at least meets a threshold confidence level;
wherein the confidence levels, in each given iteration, are inversely proportional to the magnitude of revisions to the model architecture relative to an immediately preceding iteration of the model architecture.

15. The non-transitory computer-readable medium of claim 14, wherein the program of instructions, when executed by at least one computer system, causes the at least one computer system to:
in response to a determination that the confidence level determined for the model architecture at least meets the threshold confidence level, test the model architecture, wherein the testing comprises:
commanding the algorithm to generate, via the model architecture, an output depth data representation of an environment, based on a sample image data representation of the environment; and
validating the model architecture in response to a determination that a level of error between the output depth data representation and a sample depth data representation of the environment is less than a threshold error level.

16. The non-transitory computer-readable medium of claim 15, wherein the testing further comprises:
   prior to validating the model architecture, and in response to a determination that a level of error between the output depth data representation and a sample depth data representation of the environment at least meets a threshold error level:
      reducing the confidence value for the model architecture, and
      iteratively performing the adjusting of the model architecture until the confidence level at least meets the threshold confidence level.

17. The non-transitory computer-readable medium of claim 15, wherein the program of instructions, when executed by at least one computer system, causes the at least one computer system to:
   in response to validating the model architecture, install the algorithm in one or more sensor data-processing systems installed in one or more vehicles, wherein the one or more sensor data-processing systems are coupled to one or more passive sensor devices installed in the one or more vehicles, such that the installing configures each vehicle of the one or more vehicles to:
      generate depth data representations of environments in which the respective vehicle is located, based on processing image data representations of the environments which are generated by the one or more passive sensor devices installed in the respective vehicle.

18. The non-transitory computer-readable medium of claim 17, wherein the installing further configures each vehicle of the one or more vehicles to:
   identify one or more objects located in the environments in which the respective vehicle is located, based on the generated depth data representations of the environments; and
   generate a set of control element command signals which, when executed by a set of control elements installed in the respective vehicle, cause the respective vehicle to be navigated along a driving route which accounts for the identified objects in the environments.

19. The non-transitory computer-readable medium of claim 18, wherein the installing further configures each vehicle of the one or more vehicles to:
   generate a set of control element command signals which, when executed by a set of control elements installed in the respective vehicle, cause the respective vehicle to be navigated along a driving route which avoids intersection with the identified objects in the environments.

20. The non-transitory computer-readable medium of claim 17, wherein:
   each vehicle, of the one or more vehicles, is independent of any active sensor devices configured to generate depth data representations of environments in which the respective vehicle is located, such that the installing configures each vehicle of the one or more vehicles to generate depth data representations of the environments independently of any active sensor devices.

* * * * *